United States Patent Office 3,784,638
Patented Jan. 8, 1974

3,784,638
PREPARATION OF TERTIARY ORGANO-
PHOSPHINE OXIDES
Ronald F. Lambert, Melrose, Mass., assignor to Polaroid
Corporation, Cambridge, Mass.
No Drawing. Filed Dec. 24, 1969, Ser. No. 888,023
Int. Cl. C07f 9/28, 9/30
U.S. Cl. 260—526 S               7 Claims

ABSTRACT OF THE DISCLOSURE

Organophosphines are converted to their final phosphorus oxidation products by the addition of 1, 2 or 3 atom equivalents of oxygen by treating the primary, secondary or tertiary organophosphine starting material with aqueous alkali.

---

This invention relates to a novel chemical synthesis and, more particularly, to a novel method of effecting oxidation of various organophosphines.

It is the primary object of the present invention to provide an economical and efficient method of oxidizing certain primary, secondary and tertiary organophosphines to their final phosphorus oxidation products.

Other objects of the invention will in part be obvious and will in part appear hereinafter.

The invention accordingly comprises the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

According to the present invention, aqueous alkali-soluble organophosphines may be converted to their final phosphorus oxidation products by the addition of either 1, 2 or 3 atom equivalents of oxygen as determined by the number of initial organic radicals in the starting material. This is achieved by treating the starting material with aqueous alkali wherein the source of the atom equivalents of oxygen is the aqueous medium. Thus, alkali-soluble tertiary organophosphines, $PR_3$, wherein R is an organic radical are converted to the corresponding tertiary organophosphine oxides, $(O)PR_3$ by the addition of 1 atom equivalent of oxygen. Secondary and primary organophosphines, $HPR_2$ and $H_2PR$, which are soluble in aqueous alkali, are oxidized presumably through intermediate oxidation states to their respective final oxidation products, namely, phosphinic acids, $R_2P(O)(OH)$ and phosphonic acids, $RP(O)(OH)_2$ by the addition of 2 and 3 atom equivalents of oxygen, respectively.

The following reaction schemes are shown so as to be illuminating and thereby to clarify the description of the chemical transformation described herein and do not imply any actual knowledge of the suggested sequence of events and therefore should not be limiting but merely illustrative.

(A)
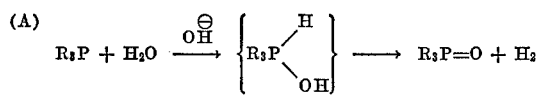

(B)
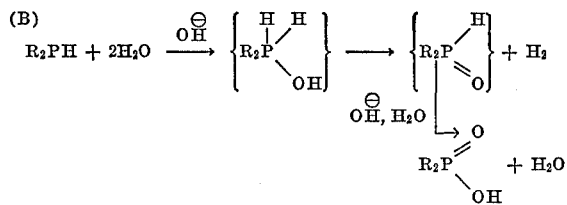

(C)
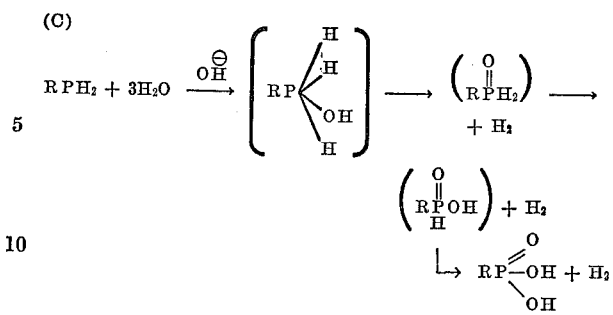

The preparation of phosphonic and phosphinic acids from intermediate oxidation products of primary and secondary phosphines using alkali is known. Ref: R. F. Hudson, Structure and Mechanism in Organo-Phosphorus Chemistry, Academic Press, N.Y., 1965, pp. 164–198 and Oxidation Methods for $R_3P$ to $R_3P=O$, Houben-Weyl, "Methoden der Organishen Chemie, Band XII/I, Glorg Thieme Verday, Stuttgart, Germany, 1963, pp. 140–144. However, it is quite unexpected that these acids may be produced directly from primary and secondary phosphines by treating with aqueous alkali. Converting tertiary phosphines to their corresponding oxides using aqueous alkali rather than an oxidizing agent, such as a peroxide, or aerial oxidation also is unexpected. This discovery offers a rapid and efficient method for preparing certain tertiary phosphine oxides, phosphonic acids and phosphinic acids which is simpler and more economical than prior methods of preparing these products wherein several steps and more expensive starting materials are required. Additionally, the present method offers the advantage of being especially useful for raising the oxidation state of unsaturated aliphatic starting materials without reaction occurring at the unsaturated sites.

Another advantage of this method of oxidation is that it is specific for alkali-soluble phosphorus functions. Therefore, if other air, oxygen, or oxidation-sensitive function groups or atoms are present in the same molecule such as (a) olefinic substituents;
(b) trialkylboranes ($R_3B$) $R_2B-C_n-P<$;
(c) tetraalkylsilanes ($R_4Si$) $R_3Si-C_n-P<$;
(d) or a distant alkali insensitive, air-sensitive $R_3P$ moiety; $R_2P-C_n-P<$; they are not susceptible to aqueous alkaline oxidation.

As the starting material in the present process, any primary, secondary or tertiary organophosphine may be employed provided that it is soluble in aqueous alkali. Suitable starting materials are water-soluble phosphines of the formula, PR'R"R''' wherein R', R" and R''' each are selected from hydrogen; an aliphatic radical, substituted and unsubstituted; a cycloaliphatic radical, substituted and unsubstituted; an aromatic radical, substituted or unsubstituted; and a heterocyclic radical, substituted and unsubstituted, not more than two of said R', R" and R''' being hydrogen.

The R', R" and R''' radicals may possess ethylenic or acetylenic unsaturation, and the carbon chains may be interrupted by heteroatoms such as sulfur, oxygen, nitrogen and boron atoms or heteroatom groups, such as

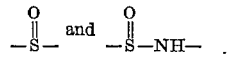

Also, the radicals may contain substituents, e.g., phenyl, alkyl, alkyl ether, aryl ether, alkyl thioether, aryl thioether, hydroxy, sulfhydryl, carboxy, sulfo, nitro, amino, monoalkylamino, dialkylamino, etc.

Illustrative of suitable radicals are substituted and unsubstituted alkyl groups, such as, methyl, ethyl, octyl, dodecyl; substituted and unsubstituted cycloalkyl radicals, such as, cyclohexyl, cyclopentyl, cyclooctyl; substituted and unsubstituted alkenyl groups, such as vinyl, allyl, butenyl, decenyl, octadienyl, hexatrienyl; substituted and unsubstituted cycloalkenyl groups, such as cyclopentenyl, cycloheptenyl, cyclohexadienyl; substituted and unsubstituted alkynyl groups, such as ethynyl, hexynyl, octynyl; substituted and unsubstituted aryl radicals, such as, phenyl, tolyl, benzyl and naphthyl; and substituted and unsubstituted heterocyclic groups, such as those having a 4-, 5- or 6-membered ring and containing O, N, S, P and combinations thereof derived from, e.g., pyrrole, pyrazole, oxazole, thiazole, imidazole, pyrimidine, piperidine, piperazine, thiophene, pyrrolidine, azetidine and phosphetan, phospholane, phospholene, and phosphorinane.

Ordinarily, tertiary organophosphines such as trialkyl and triaryl phosphines are insoluble in water and aqueous alkali. These phosphines do not undergo this oxidation. To render such materials soluble in aqueous alkali, at least one of the R′, R″ and R‴ radicals should contain a solubilizing substituent. Illustrative solubilizing substituents include —SH, —NH₂, —OH, —COOH, —SO₃H, —NHSO₂R and

wherein R typically is hydrogen or alkyl and A is an anion, such as chloride. Another illustrative solubilizing substituent is

wherein X and Y are electron withdrawing groups, e.g., —F, —CF₃, —NO₂, —CN,

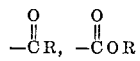

—SO₂R wherein R typically is alkyl. In this case,

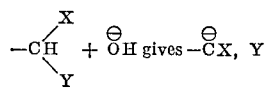

thereby rendering the group soluble in aqueous alkali.

In the present process, the aqueous alkali may be thought of as functioning as a catalyst and is not consumed in the reaction. For practical purposes, the concentration of alkali in the medium should not fall below about $10^{-5}$ normal which corresponds to approximately a pH of about 9 (corrected for phosphine). Usually, we have carried out the process, 0.1 N in R₃P with a $2 \times 10^2$ fold alkali excess, i.e., 2 N, for convenience. Any strong base may be used, such as alkali metal and alkaline earth metal hydroxides, alkoxides, phenoxides, oxides and carbonates. Alkali metal hydroxides, such as sodium and potassium hydroxides, have been found particularly satisfactory.

The reaction temperature may vary widely and generally ranges from room temperature, i.e., about 20° C. to 100° C. Ordinarily, the reaction is carried out at elevated temperatures and, preferably, at about 100° C. It will be appreciated by those skilled in the art that when the reaction is conducted at elevated temperatures, the reaction mixture is cooled after the evolution of gas ceases to avoid any cleavage of the organic radicals initially present in the starting material. Though it is not essential, the reaction is preferably conducted under an inert atmosphere, such as, argon or nitrogen.

The following examples are given to further illustrate the present invention and are not intended to limit the scope thereof.

EXAMPLE 1

Preparation of methyl-bis(2-carboxyethyl)phosphine oxide

To 100 ml. of 2 N aqueous sodium hydroxide, at reflux, under an argon atmosphere was delivered 2.28 g. (0.01 mole) of methyl-bis(2-carboxyethyl)phosphine hydrochloride in 2 cc. of distilled water by syringe through a serum cap inlet. After 3 hours at reflux, the oxidation was complete as judged by the cessation of hydrogen gas evolution. The reaction mixture was made slightly acid (pH 4) by the cautious addition of concentrated hydrochloric acid. The contents of the flask were evaporated to dryness under reduced pressure on the rotary evaporator. The phosphine oxide product was removed from the inorganic salts by continuous extraction with isopropyl alcohol. Evaporation and recrystallization from methanol gave 980 mg. (51% by weight) of product (melting range 166–169° C.).

EXAMPLE 2

Preparation of bis-3-hydroxypropyl phosphinic acid

To 100 ml. of 2 N aqueous sodium hydroxide at reflux, under an argon atmosphere was delivered 0.160 g. (1.08 mmoles) of bis(3-hydroxypropyl)phosphine, boiling range 124–125° C./0.22 mm. Hg, by syringe through a serum cap inlet. Hydrogen gas evolution began immediately and was followed by water displacement. After 10 minutes, the required two equivalents of hydrogen gas, 52 ml., had been collected indicating that oxidation had proceeded to the phosphinic acid stage. The cooled alkaline solution was evaporated to dryness and the infrared spectrum and N.M.R. spectrum of the sodium salt of bis(3-hydroxypropyl)phosphinic acid was compared with spectra obtained on material from an independent route. The yield, 0.23 g. of crude residue of sodium phosphinate, was approximately quantitative as estimated by subtraction of the weight of sodium hydroxide.

EXAMPLE 3

Preparation of tris(3-hydroxyphenyl)phosphine oxide

To 200 ml. of 2 N aqueous sodium hydroxide at reflux under an argon atmosphere was delivered 3.912 g. (0.01 mole) of tris(4-hydroxyphenyl)phosphine hydrobromide in 10 cc. of methanol by syringe through a serum cap inlet. After 4 hours at reflux, the oxidation was shown to be complete by the collection of 242 ml. of hydrogen gas by water displacement. The reaction mixture was allowed to stand at room temperature and a fluffy white precipitate was deposited. It was filtered under nitrogen and recrystallized from methanol to give 0.8 g. of material whose infrared spectrum was identical to the desired product. The filtrate was made acid (pH 1) by the addition of aqueous 48% by weight hydrobromic acid solution. The water was removed under reduced pressure and the dry residue extracted with methanol. Evaporation of the methanol gave a pink solid 2.92 g. which on recrystallization from methanol gave 2.4 g. (73% by weight) of material, melting range 173–174° C. homogeneous on thin layer chromatography whose IR and N.M.R. spectra were identical with a sample of the tris(4-hydroxyphenyl)phosphine oxide prepared by hydrogen bromide ether cleavage of tris(p-methoxyphenyl)phosphine oxide.

EXAMPLE 4

Preparation of tris(3-hydroxypropyl)phosphine oxide

In a similar manner to Example 1, tris(3-hydroxypropyl)phosphine (boiling point 202° C./0.1 mm. Hg) was converted to tris(3-hydroxypropyl)phosphine oxide in a 38% by weight yield, melting range 108°–110° C.

EXAMPLE 5

In a similar manner to Example 1, tris(2-carboxyethyl) phosphine hydrochloride (melting range 178–179° C.)

was converted to tris(2-carboxyethyl)phosphine oxide, melting range 148-150° C., in a 56% by weight yield.

EXAMPLE 6

Preparation of methyl-bis(3-hydroxypropyl)phosphine oxide

In a slightly modified procedure given in Example 1, the inorganic residue (after acidification and evaporation) was repeatedly extracted with chloroform. Evaporation of the dried chloroform layers gave a colorless oil whose infrared spectrum, N.M.R. spectrum and GLCP indicated that this material (35% by weight) was identical to a sample of methyl-bis(3-hydroxypropyl)phosphine oxide prepared by oxidation with 35% hydrogen peroxide in acetic acid.

It will be appreciated by those skilled in the art that certain changes may be made in the present invention without departing from the scope thereof. For instance, in the process illustrated by the above examples, strong alkaline media other than aqueous sodium hydroxide may be employed. Also, the respective final oxidation products may be isolated and purified by using other appropriate solvents, for extraction and recrystallization, or for that matter, by using other suitable and convenient procedures conventionally used in the art.

The compounds produced in accordance with the present invention find a variety of uses. The tertiary phosphine oxides may be employed as flame retardants and as intermediates in the preparation of other phosphorus-containing organic compounds. The phosphonic and phosphinic acids find utility as insecticides, herbicides and defoliating agents.

Since certain changes may be made in the above method without departing from the scope of the invention herein involved, it is intended that all matter contained in the above description shall be interpreted as illustrative and not in a limiting sense.

What is claimed is:

1. A method of oxidizing a tertiary organophosphine to the corresponding tertiary phosphine oxide which comprises treating a tertiary trihydrocarbyl phosphine with aqueous alkali having a pH of at least 9 at a temperature between about 20° C. and 100° C. under an inert atmosphere, said tertiary trihydrocarbyl phosphine being soluble in said aqueous alkali and at least one of said trihydrocarbyl groups being substituted with a carboxy group.

2. A method of oxidizing a tertiary organophosphine to the corresponding tertiary organophosphine oxide which comprises treating a tertiary organophosphine of the formula PR'R"R''' with aqueous alkali having a pH of at least 9 at a temperature between about 20° C. and 100° C. under an inert atmosphere, said tertiary organophosphine being soluble in said aqueous alkali and said R', R" and R''' in the above formula each being selected from alkyl and phenyl and at least one of said R', R" and R''' being substituted with a carboxy group.

3. A method according to claim 1 wherein said R', R" and R''' of said tertiary organophosphine are selected from alkyl and carboxy-alkyl.

4. A method according to claim 3 wherein said organophosphine is methyl-bis(2-carboxyethyl)phosphine.

5. A method according to claim 1 wherein said aqueous alkali is aqueous sodium hydroxide.

6. A method according to claim 1 wherein said temperature is about 100° C.

7. A method according to claim 2 wherein said organophosphine is tris(2-carboxyethyl)phosphine.

References Cited
UNITED STATES PATENTS 3,110,727    11/1963    Toy et al. _____ 260—502.4 R
3,238,248    3/1966    Rauhut _____ 260—537 S VIVIAN GARNER, Primary Examiner U.S. Cl. X.R.

260—239 A, 251 P, 268 K, 293.63, 302 F, 307 R, 309, 310 R, 326.61, 329 P, 448.2 B, 502.4 R, 502.5, 505 C, 505 R, 513 R, 514 J, 515 M, 537 S, 556 A, 567.6 R, 576, 578, 583 E, 606.5 P